(12) United States Patent
Iwai et al.

(10) Patent No.: US 8,116,617 B2
(45) Date of Patent: *Feb. 14, 2012

(54) DISK UNIT-INTEGRATED TELEVISION AND DISK UNIT-INTEGRATED DISPLAY

(75) Inventors: Takeo Iwai, Daito (JP); Tomokazu Sugamura, Daito (JP)

(73) Assignee: Funai Electric Co., Ltd., Daito-shi (JP)

(*) Notice: Subject to any disclaimer, the term of this patent is extended or adjusted under 35 U.S.C. 154(b) by 1454 days.

This patent is subject to a terminal disclaimer.

(21) Appl. No.: 11/642,864

(22) Filed: Dec. 21, 2006

(65) Prior Publication Data

US 2007/0147797 A1    Jun. 28, 2007

(30) Foreign Application Priority Data

Dec. 22, 2005  (JP) .................................. 2005-010865

(51) Int. Cl.
 *H04N 5/77* (2006.01)
(52) U.S. Cl. ........................................ 386/359; 386/358
(58) Field of Classification Search .................. None
 See application file for complete search history.

(56) References Cited

U.S. PATENT DOCUMENTS

| | | |
|---|---|---|
| 2005/0213933 A1 | 9/2005 | Tajima et al. |
| 2006/0103886 A1 | 5/2006 | Yokawa |

FOREIGN PATENT DOCUMENTS

| | | |
|---|---|---|
| JP | 5-242661 A | 9/1993 |
| JP | 8-56318 A | 2/1996 |
| JP | 2001-309278 A | 11/2001 |
| JP | 2005-135684 A | 5/2002 |
| JP | 3090085 U | 9/2002 |
| JP | 3107004 U | 11/2004 |
| JP | 3108586 U | 2/2005 |
| JP | 2005-278063 A | 10/2005 |
| JP | 2005-340966 A | 12/2005 |

OTHER PUBLICATIONS

Japanese Office Action with English translation dated Mar. 2, 2006 (Five (5) pages).

*Primary Examiner* — William C Vaughn, Jr.
*Assistant Examiner* — Asher Khan
(74) *Attorney, Agent, or Firm* — Crowell & Moring LLP (57) ABSTRACT

A disk unit-integrated display capable of being downsized while inhibiting the number of components from increase is obtained. This disk unit-integrated display includes a disk unit, a cover member arranged on an upper surface of the disk unit and including a mounting portion, a first circuit board mounted on the mounting portion of the cover member, a second circuit board arranged below the disk unit, and a relay board so mounted as to extend in a direction substantially perpendicular to a surface of the second circuit board and supported by the first circuit board, wherein the first circuit board includes a first terminal portion, and the relay board includes a first terminal receiving hole receiving the first terminal portion.

20 Claims, 6 Drawing Sheets

DISK UNIT-INTEGRATED TELEVISION AND DISK UNIT-INTEGRATED DISPLAY

BACKGROUND OF THE INVENTION

1. Field of the Invention

The present invention relates to a disk unit-integrated television and a disk unit-integrated display, and more particularly, it relates to a disk unit-integrated television and a disk unit-integrated display provided with a circuit board for controlling a disk unit.

2. Description of the Background Art

A structure of a picture reproducer such as a disk unit is known in general. For example, Japanese Patent Laying-Open No. 5-242661 (1993) discloses a structure of a video tape recorder (VTR) as the structure of the picture reproducer. The VTR disclosed in Japanese Patent Laying-Open No. 5-242661 (1993) includes a mechanical deck provided with three connectors on its side surface and a relay board provided with three connectors for connecting to the three connectors, in which the relay board is mounted on the mechanical deck by connecting the connectors of the mechanical deck and the connectors of the relay board.

A structure of a disk unit such as a DVD (digital versatile disk) deck is also known in general. For example, Utility Model Registration No. 3090085 discloses a structure of a DVD deck, in which a holder mounted on a chassis supports a main board and a progressive board in a horizontal direction. In the DVD deck disclosed in Utility Model Registration No. 3090085, the progressive board is arranged above the main board and a DVD unit is so provided as to be adjacent to the main board and the progressive board supported in the horizontal direction by the holder. Utility Model Registration No. 3107004 discloses a structure of a disk unit, in which a circuit board placed on an upper surface of a body of a disk drive mechanism, is located by two engaging hooks provided in the body of the disk drive mechanism and three expansion portions provided in a top cover.

Figure 7:
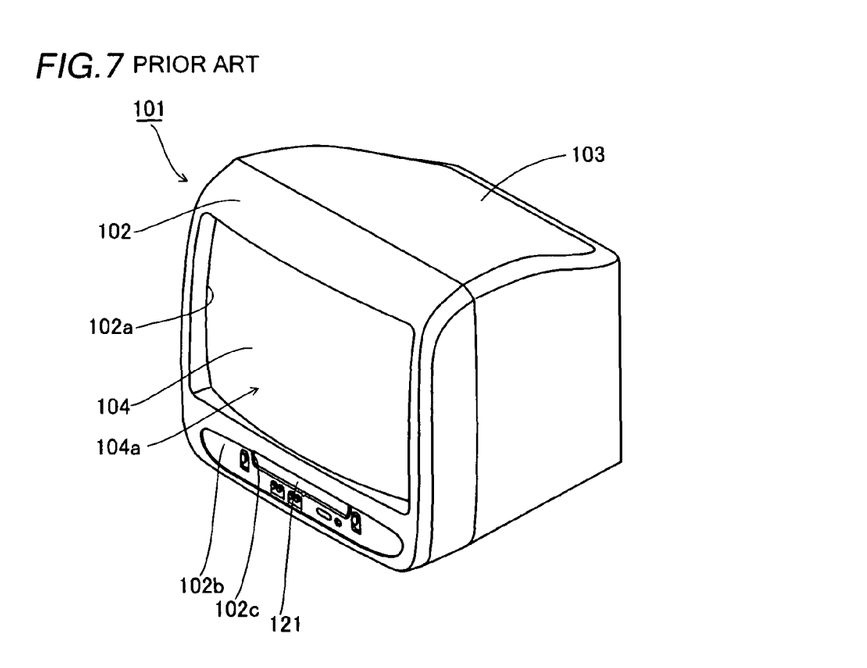
FIG. 7 is a perspective view showing an overall structure of a conventional DVD-integrated television.
Figure 8:
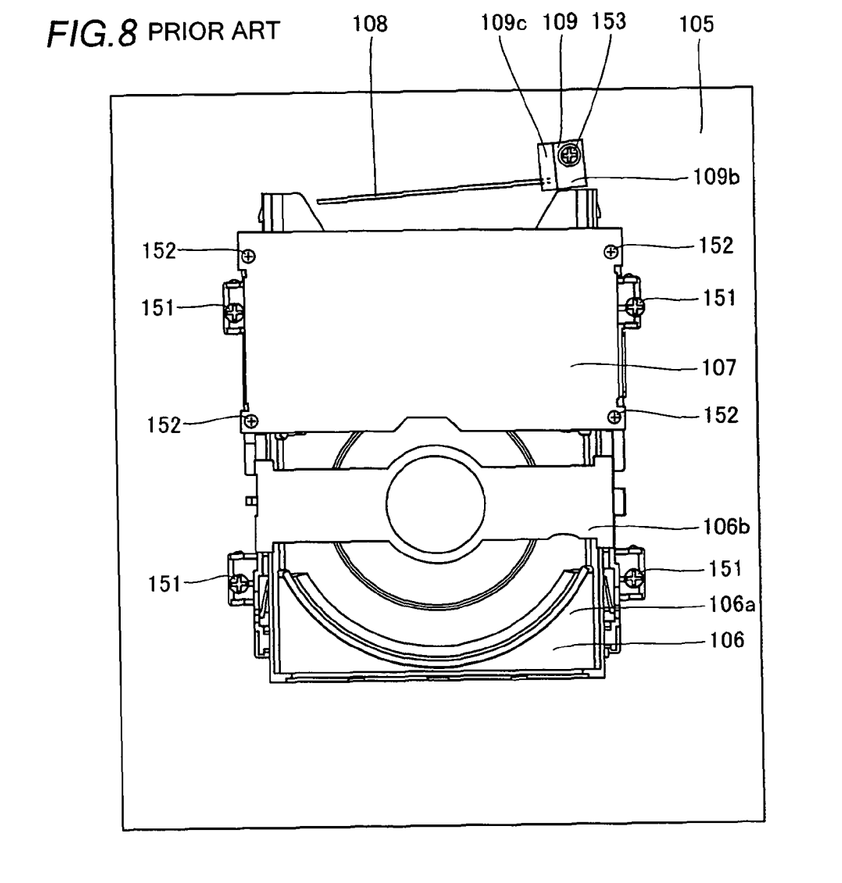
FIG. 8 is a plan view showing a vicinity of a DVD drive unit of the conventional DVD-integrated television shown in FIG. 7.
Figure 9:
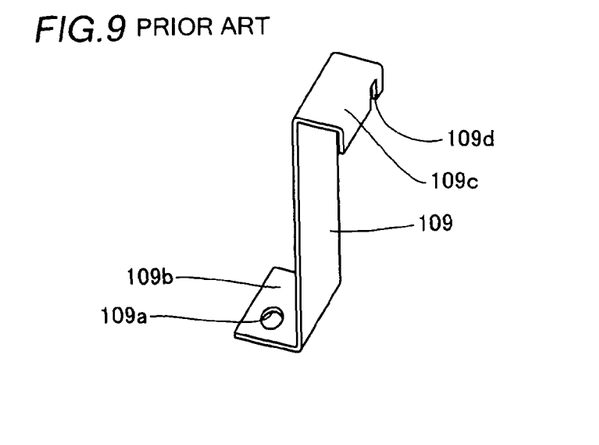
FIG. 9 is a perspective view showing a supporting member of the conventional DVD-integrated television shown in FIG. 7.

A DVD integrated television (disk unit-integrated display) provided with a DVD drive unit (disk unit) is known in general. FIG. 7 is a perspective view showing an overall structure of a conventional DVD integrated television 101. FIG. 8 is a plan view showing a vicinity of a DVD drive unit of the conventional DVD integrated television 101 shown in FIG. 7. FIG. 9 is a perspective view showing a supporting member of the conventional DVD integrated television 101 shown in FIG. 7. With reference to FIGS. 7 to 9, the conventional DVD integrated television 101 will be described.

As shown in FIGS. 7 and 8, the conventional DVD integrated television 101 includes a front cabinet 102 and a rear cabinet 103 constituting an outer frame of the DVD integrated television 101, a CRT (cathode ray tube) 104 mounted on the front cabinet 102, a main circuit board 105 for controlling display operation of the CRT 104, a DVD drive unit 106 for driving a DVD (not shown), a cover member 107 provided on an upper surface of the DVD drive unit 106, a DVD circuit board 108 for controlling the DVD drive unit 106, and a supporting member 109 for supporting the DVD circuit board 108.

As shown in FIG. 7, the front cabinet 102 is provided with a display window 102a exposing an after-mentioned display region 104a of the CRT 104, an operating portion 102b in which various manual operation buttons such as a power supply are arranged, and an opening 102c for projecting an after-mentioned disk tray 106a of the DVD drive unit 106 outside the front cabinet 102. The opening 102c is mounted with a door member 121 that opens and closes in conjunction with projecting and housing of the disk tray 106a of the DVD drive unit 106. The rear cabinet 103 is mounted on the front cabinet 102 by screws (not shown).

The CRT 104 is mounted on the front cabinet 102 while the display region 104a is exposed from the display window 102a of the front cabinet 102, as shown in FIG. 7. The DVD drive unit 106 is mounted on the main circuit board 105 for controlling display operation of the CRT 104 that is arranged below the CRT 104, by screws 151, as shown in FIG. 8.

The DVD drive unit 106 includes the disk tray 106a, and a DVD drive unit body portion (disk unit body) 106b on which the disk tray 106a is mounted slidably in an anteroposterior direction. The disk tray 106a slides in the anteroposterior direction, whereby the disk tray 106a is projected outside the front cabinet 102 through the opening 102c of the front cabinet 102 and is housed inside the front cabinet 102. Thus, the disk tray 106a has a function of conveying a DVD (not shown) arranged therein. The cover member 107 is mounted on the DVD drive unit body portion 106b by screws 152. The DVD circuit board 108 for controlling the DVD drive unit 106 is so mounted as to extend in a direction perpendicular to a surface of the main circuit board 105.

As shown in FIGS. 8 and 9, the supporting member 109 for supporting the DVD circuit board 108 is provided with a screw mounting portion 109b formed with a screw receiving hole 109a on its first end side and a U-shaped circuit board supporting portion 109c on its second end side. A screw 153 is fitted in the main circuit board 105 via the screw receiving hole 109a of the screw mounting portion 109b, whereby the supporting member 109 is mounted on the main circuit board 105. A cutout portion 109d in which the DVD circuit board 108 is arranged is provided in a distal end of the U-shaped circuit board supporting portion 109c.

In the conventional DVD integrated television 101 shown in FIG. 8, however, while the DVD circuit board 108 that is so mounted as to extend in a direction perpendicular to the main circuit board 105 can be supported by arranging the DVD circuit board 108 in the cutout portion 109d of the supporting member 109, the supporting member 109 must be provided separately, thereby posing a problem that that the number of components is increased.

In a structure of the VTR disclosed in the aforementioned Japanese Patent Laying-Open No. 5-242661 (1993), the relay board is mounted on the mechanical deck by connecting the three connectors of the mechanical deck and the three connectors of the relay board, so that the mechanical deck and the relay board must be provided with three connectors respectively. Therefore, it is difficult to reduce the number of components by providing one connector instead of the three connectors, thereby posing a problem that the number of components is increased.

In a structure of the DVD deck disclosed in the aforementioned Utility Model Registration No. 3090085, the DVD unit is so provided as to be adjacent to the main board and the progressive board supported in a horizontal direction by the holder, a region for arranging the main board and the progressive board supported in a horizontal direction by the holder must be provided separately from a region for arranging the DVD unit. Thus, there is a problem that the DVD deck grows in size.

In a structure of the disk unit disclosed in the aforementioned Utility Model Registration No. 3107004, the circuit board placed on an upper surface of the body of the disk drive mechanism is located by the two engaging hooks provided with the body of the disk drive mechanism and the three expansion portions provided on the top cover. On the other hand, in the DVD integrated television, the CRT is arranged above the disk unit, whereby a large space exists between an upper surface of the disk unit and the top cover (housing). Therefore, in the DVD integrated television, it is difficult to provide an expansion portion on the top cover (housing) and locate the circuit board placed on the upper surface of the disk unit, whereby it is difficult to apply the structure of the disk unit disclosed in the aforementioned Utility Model Registration No. 3107004 to the DVD integrated television. In Utility Model Registration No. 3107004, in a case where the relay board connecting to the circuit board is provided, it is conceivable that a member for supporting the relay board must be separately provided.

SUMMARY OF THE INVENTION

The present invention has been proposed in order to solve the aforementioned problems, and an object of the present invention is to provide a disk unit-integrated television and a disk unit-integrated display capable of being downsized while inhibiting the number of components from increase.

In order to attain the aforementioned object, a disk unit-integrated display according to a first aspect of the present invention comprises a disk unit including a disk unit body, a cathode ray tube displaying an image reproduced by at least the disk unit, a cover member provided on an upper surface of the disk unit body and including an mounting portion, a first circuit board for controlling the disk unit, mounted on the mounting portion of the cover member, a second circuit board for controlling display operation by the cathode ray tube, so arranged below the disk unit body as to overlap with the disk unit body, and a relay board so mounted as to extend in a direction substantially perpendicular to a surface of the second circuit board, supported by the first circuit board, and arranged between the first circuit board and the second circuit board, wherein the first circuit board includes a first terminal portion protruding in a direction substantially parallel to a surface of the first circuit board, and the relay board includes a first terminal receiving hole receiving the first terminal portion of the first circuit board.

In the disk unit-integrated display according to the first aspect, as hereinabove described, the cover member formed on the upper surface of the disk unit body is provided with the mounting portion, and the first circuit board for controlling the disk unit is mounted on the mounting portion of the cover member, whereby no supporting member for supporting the first circuit board may be provided separately. Thus, the number of components can be inhibited from increase. The relay board is arranged between the first circuit board for controlling the disk unit and the second circuit board for controlling display operation by the cathode ray tube, the first circuit board is provided with the first terminal portion, and the relay board is provided with the first terminal receiving hole receiving the first terminal portion, whereby the relay board can be supported by the first circuit board without separately providing a member supporting the relay board. Also according to this structure, the number of components can be inhibited from increase. The first circuit board for controlling the disk unit is arranged in the mounting portion of the cover member provided on the upper surface of the disk unit, whereby the disk unit-integrated display can be downsized dissimilarly to a case where the circuit board for controlling the disk unit is so arranged as to be adjacent to the disk unit. The second circuit board for controlling display operation by the cathode ray tube is so provided below the disk unit body as to overlap with the disk unit body, whereby the disk unit-integrated display can be further downsized dissimilarly to a case where the circuit board for controlling the display operation by the cathode ray tube is so arranged as to be adjacent to the disk unit. Thus, the disk unit-integrated display can be downsized while inhibiting the number of components from increase.

In the aforementioned disk unit-integrated display according to the first aspect, the relay board preferably includes a first surface with a wiring formed thereon and a second surface without a wiring formed thereon, and the first terminal portion of the first circuit board and the first surface of the relay board are preferably electrically connected to each other in a state that the first terminal portion of the first circuit board is inserted into the first terminal receiving hole of the relay board. According to this structure, the first circuit board and the relay board can be electrically connected to each other without using a connector or the like. Also according to this structure, the number of components can be inhibited from increase.

In this case, the first terminal portion of the first circuit board is preferably fixed on the second surface of the relay board by a solder in a state that the first terminal portion of the first circuit board is inserted into the first terminal receiving hole of the relay board. According to this structure, the first terminal portion of the first circuit board can be fixed on the relay board with no influence on electrical connection between the first circuit board and the relay board.

In the disk unit-integrated display according to the first aspect, the relay board preferably includes a second terminal portion protruding in a direction substantially parallel to a surface of the relay board, and the second circuit board preferably includes a second terminal receiving hole receiving the second terminal portion of the relay board. According to this structure, the second terminal portion of the relay board is inserted into the second terminal receiving hole of the second circuit board, whereby the relay board can be mounted on the second circuit board.

In this case, the second circuit board preferably includes a first surface with a wiring formed thereon and a second surface without a wiring formed thereon, and the second terminal portion of the relay board and the first surface of the second circuit board are preferably electrically connected to each other in a state that the second terminal portion of the relay board is inserted into the second terminal receiving hole of the second circuit board. According to this structure, the relay board and the second circuit board can be electrically connected to each other without using a connector or the like. Also according to this structure, the number of components can be inhibited from increase.

In the aforementioned structure in which the second circuit board includes the second surface, the second terminal portion of the relay board is preferably fixed on the second surface of the second circuit board by a solder in a state that the second terminal portion of the relay board is inserted into the second terminal receiving hole of the second circuit board. According to this structure, the second terminal portion of the relay board can be fixed on the second circuit board with no influence on electrical connection between the second circuit board and the relay board.

The aforementioned disk unit-integrated display according to the first aspect preferably further comprises a holding member arranged below the second circuit board and supporting the second circuit board and the disk unit, wherein the holding member preferably integrally includes a pair of guide portions for guiding a side end surface of the relay board in a direction substantially perpendicular to the second circuit board, the pair of guide portions are preferably so provided as to hold both of the side end surfaces of the relay board therebetween and extend upwardly, and the second circuit board preferably includes a guide portion receiving hole so arranged that each of the pair of guide portions protrudes upwardly from the second circuit board therethrough. According to this structure, the relay board can be easily mounted so as to extend in a direction perpendicular to the surface of the second circuit board, when the relay board is mounted on the second circuit board.

In the aforementioned disk unit-integrated display according to the first aspect, the mounting portion of the cover member is preferably formed with a screw mounting hole, and the first circuit board preferably includes a screw receiving hole formed in a portion corresponding to the screw mounting hole of the cover member. According to this structure, a screw is fitted in the screw mounting hole of the cover member via the screw receiving hole of the first circuit board, whereby the first circuit board can be easily mounted on the cover member.

In the aforementioned disk unit-integrated display according to the first aspect, the mounting portion of the cover member is preferably formed with a first position regulating rib portion for regulating a position of the first circuit board with respect to a direction in which the first terminal portion extends. According to this structure, locating can be easily carried out when the first circuit board is mounted on the cover member.

In the aforementioned disk unit-integrated display according to the first aspect, the mounting portion of the cover member is preferably formed with a second position regulating rib portion for regulating a position of the first circuit board with respect to a direction substantially perpendicular to a direction in which the first terminal portion extends. According to this structure, locating can be more easily carried out when the first circuit board is mounted on the cover member.

In the aforementioned disk unit-integrated display according to the first aspect, the cover member is preferably provided with a supporting portion for supporting a vicinity of the first terminal portion of the first circuit board. According to this structure, the first circuit board can be more stably mounted on the cover member.

In this case, the supporting portion of the cover member is preferably formed with a cutout portion for receiving a side end of the first circuit board. According to this structure, the first circuit board can be easily supported by the supporting portion.

A disk unit-integrated television according to a second aspect of the present invention comprises a disk unit including a disk unit body, a cathode ray tube displaying an image reproduced by at least the disk unit, a cover member provided on an upper surface of the disk unit body, a first circuit board for controlling the disk unit, a second circuit board for controlling display operation by the cathode ray tube, a relay board so mounted as to extend in a direction substantially perpendicular to a surface of the second circuit board, supported by the first circuit board, and arranged between the first circuit board and the second circuit board, and a holding member arranged below the second circuit board and supporting second circuit board and the disk unit, wherein the cover member includes a mounting portion, the first circuit board is mounted on the mounting portion of the cover member and includes a first terminal portion protruding in a direction substantially parallel to a surface of the first circuit board, the second circuit board is so arranged below the disk unit body as to overlap with the disk unit body, the holding member integrally includes a pair of guide portions for guiding a side end surface of the relay board in a direction substantially perpendicular to the second circuit board, the pair of guide portions are so provided as to hold both of the side end surfaces of the relay board therebetween and extend upwardly, the relay board includes a first surface with a wiring formed thereon, a second surface without a wiring formed thereon, a first terminal receiving hole receiving the first terminal portion of the first circuit board, and a second terminal portion protruding in a direction substantially parallel to a surface of the relay board, the first terminal portion of the first circuit board and the first surface of the relay board are electrically connected to each other in a state that the first terminal portion of the first circuit board is inserted into the first terminal receiving hole of the relay board, the second circuit board includes a first surface with a wiring formed thereon, a second surface without a wiring formed thereon, a second terminal receiving hole receiving the second terminal portion of the relay board and a guide portion receiving hole so arranged that each of the pair of guide portions protrudes upwardly from the second circuit board therethrough, and the second terminal portion of the relay board and the first surface of the second circuit board are electrically connected to each other in a state that the second terminal portion of the relay board is inserted into the second terminal receiving hole of the second circuit board.

In this disk unit-integrated television according to the second aspect, as hereinabove described, the mounting portion is provided on the cover member formed on the upper surface of the disk unit body, and the first circuit board for controlling the disk unit is mounted on the mounting portion of the cover member, whereby no supporting member for supporting the first circuit board may be provided separately. Thus, the number of components can be inhibited from increase. The relay board is arranged between the first circuit board for controlling the disk unit and the second circuit board for controlling display operation by the cathode ray tube, the first circuit board is provided with the first terminal portion, and the relay board is provided with the first terminal receiving hole receiving the first terminal portion, whereby the relay board can be supported by the first circuit board without separately providing a member for supporting the relay board. Also according to this structure, the number of components can be inhibited from increase. The first circuit board for controlling the disk unit is arranged in the mounting portion of the cover member provided on the upper surface of the disk unit, whereby the disk unit-integrated television can be downsized dissimilarly to a case where the circuit board for controlling the disk unit is so arranged as to be adjacent to the disk unit. The second circuit board for controlling display operation by the cathode ray tube is so provided below the disk unit body as to overlap with the disk unit body, whereby the disk unit-integrated television can be further downsized dissimilarly to a case where the circuit board for controlling the display operation by cathode ray tube is so arranged as to be adjacent to the disk unit. Thus, the disk unit-integrated television can be downsized while inhibiting the number of components from increase.

In the second aspect, the first terminal portion of the first circuit board and the first surface of the relay board are so formed as to be electrically connected to each other in a state that the first terminal portion of the first circuit board is inserted into the first terminal receiving hole of the relay board, whereby the first circuit board and the relay board can be electrically connected to each other without using a connector or the like. Also according to this structure, the number of components can be inhibited from increase. The relay board is provided with the second terminal portion, and the second circuit board is provided with the second terminal receiving hole receiving the second terminal portion of the relay board, whereby the second terminal portion of the relay board is inserted into the second terminal receiving hole of the second circuit board. Thus, the relay board can be mounted on the second circuit board. The second terminal portion of the relay board and the first surface of the second circuit board are so formed as to be electrically connected to each other in a state that the second terminal portion of the relay board is inserted into the second terminal receiving hole of the second circuit board, whereby the relay board and the second circuit board can be electrically connected to each other without using a connector or the like. Also according to this structure, the number of components can be inhibited from increase. The holding member supporting the second circuit board and the disk unit is provided below the second circuit board, the supporting member is integrally provided with the pair of guide portions for guiding the side end surface of the relay board in the direction substantially perpendicular to the second circuit board, and the second circuit board is provided with the guide portion receiving hole so arranged that each of the pair of guide portions protrudes upwardly from the second circuit board therethrough. Thus, the relay board can be easily mounted so as to extend in the direction perpendicular to the surface of the second circuit board when the relay board is mounted on the second circuit board.

In the aforementioned disk unit-integrated television according to the second aspect, the first terminal portion of the first circuit board is preferably fixed on the second surface of the relay board by a solder in a state that the first terminal portion of the first circuit board is inserted into the first terminal receiving hole of the relay board. According to this structure, the first terminal portion of the first circuit board can be fixed on the relay board with no influence on electrical connection between the first circuit board and the relay board.

In the aforementioned disk unit-integrated television according to the second aspect, the second terminal portion of the relay board is preferably fixed on the second surface of the second circuit board by a solder in a state that the second terminal portion of the relay board is inserted into the second terminal receiving hole of the second circuit board. According to this structure, the second terminal portion of the relay board can be mounted on the second circuit board with no influence on electrical connection between the second circuit board and the relay board.

In the aforementioned disk unit-integrated television according to the second aspect, the mounting portion of the cover member is preferably formed with a screw mounting hole, and the first circuit board preferably includes a screw receiving hole formed in a portion corresponding to the screw mounting hole of the cover member. According to this structure, a screw is fitted in the screw mounting hole of the cover member via the screw receiving hole of the first circuit board, whereby the first circuit board can be easily mounted on the cover member.

In the aforementioned disk unit-integrated television according to the second aspect, the mounting portion of the cover member is preferably formed with a first position regulating rib portion for regulating a position of the first circuit board with respect to a direction in which the first terminal portion extends. According to this structure, locating can be easily carried out when the first circuit board is mounted on the cover member.

In the aforementioned disk unit-integrated television according to the second aspect, the mounting portion of the cover member is preferably formed with a second position regulating rib portion for regulating a position of the first circuit board with respect to a direction substantially perpendicular to a direction in which the first terminal portion extends. According to this structure, locating can be more easily carried out when the first circuit board is mounted on the cover member.

In the aforementioned disk unit-integrated television according to the second aspect, the cover member is preferably provided with a supporting portion for supporting a vicinity of the first terminal portion of the first circuit board. According to this structure, the first circuit board can be more stably mounted on the cover member.

In this case, the supporting portion of the cover member is formed with a cutout portion for receiving a side end of the first circuit board. According to this structure, the first circuit board can be easily supported by the supporting portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be hereinafter described with reference to the drawings.

A structure of a DVD integrated television 1 according to the embodiment of the present invention will be described with reference to FIGS. 1 to 6. The embodiment of the present invention is applied to the DVD integrated television, which is an exemplary disk unit-integrated display (television).

Figure 1:
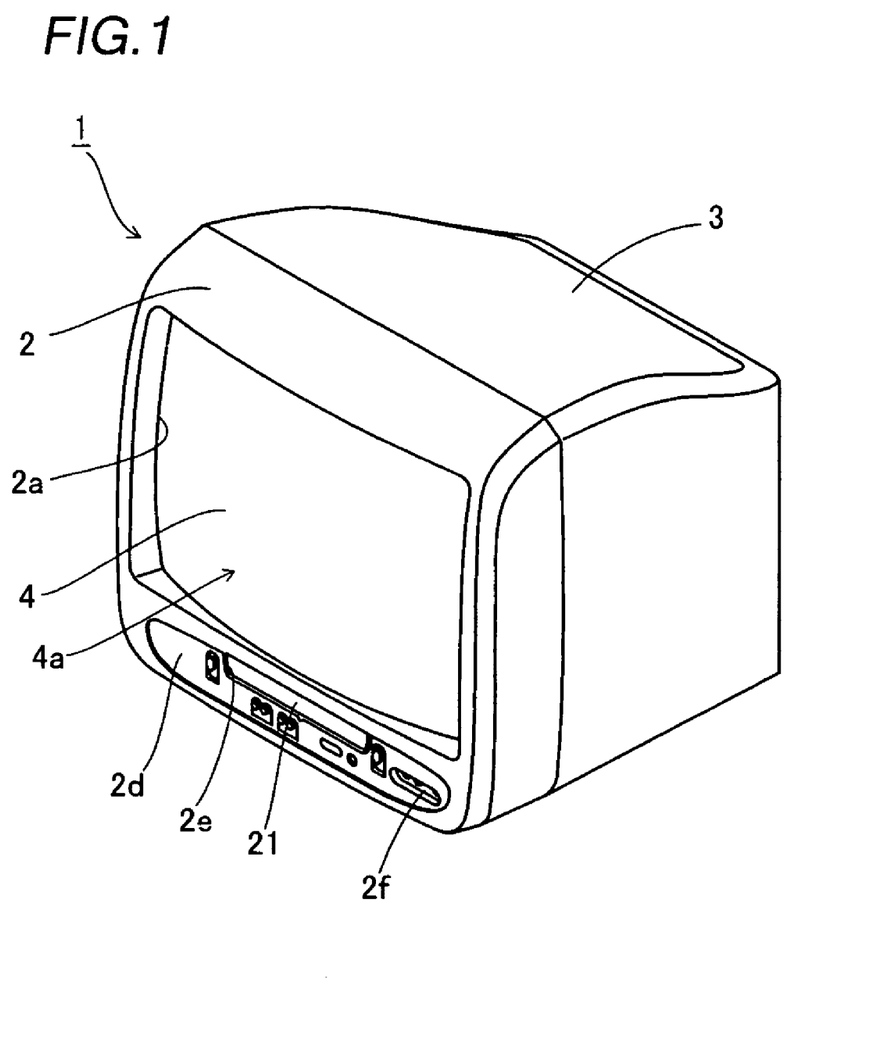
FIG. 1 is a perspective view showing an overall structure of a DVD-integrated television according to an embodiment of the present invention.
Figure 2:
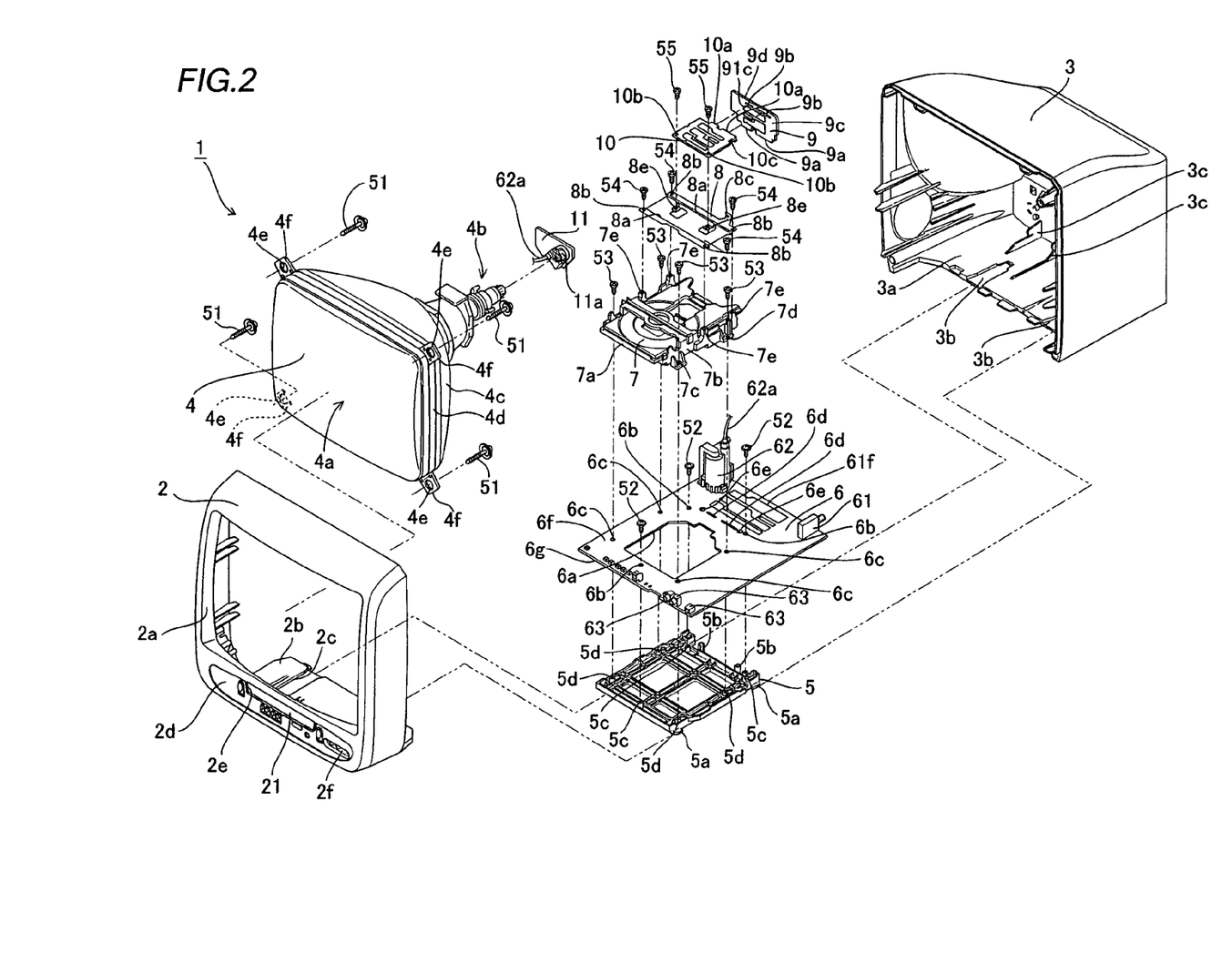
FIG. 2 is an exploded perspective view of the DVD-integrated television according to the embodiment shown in FIG. 1.
Figure 3:
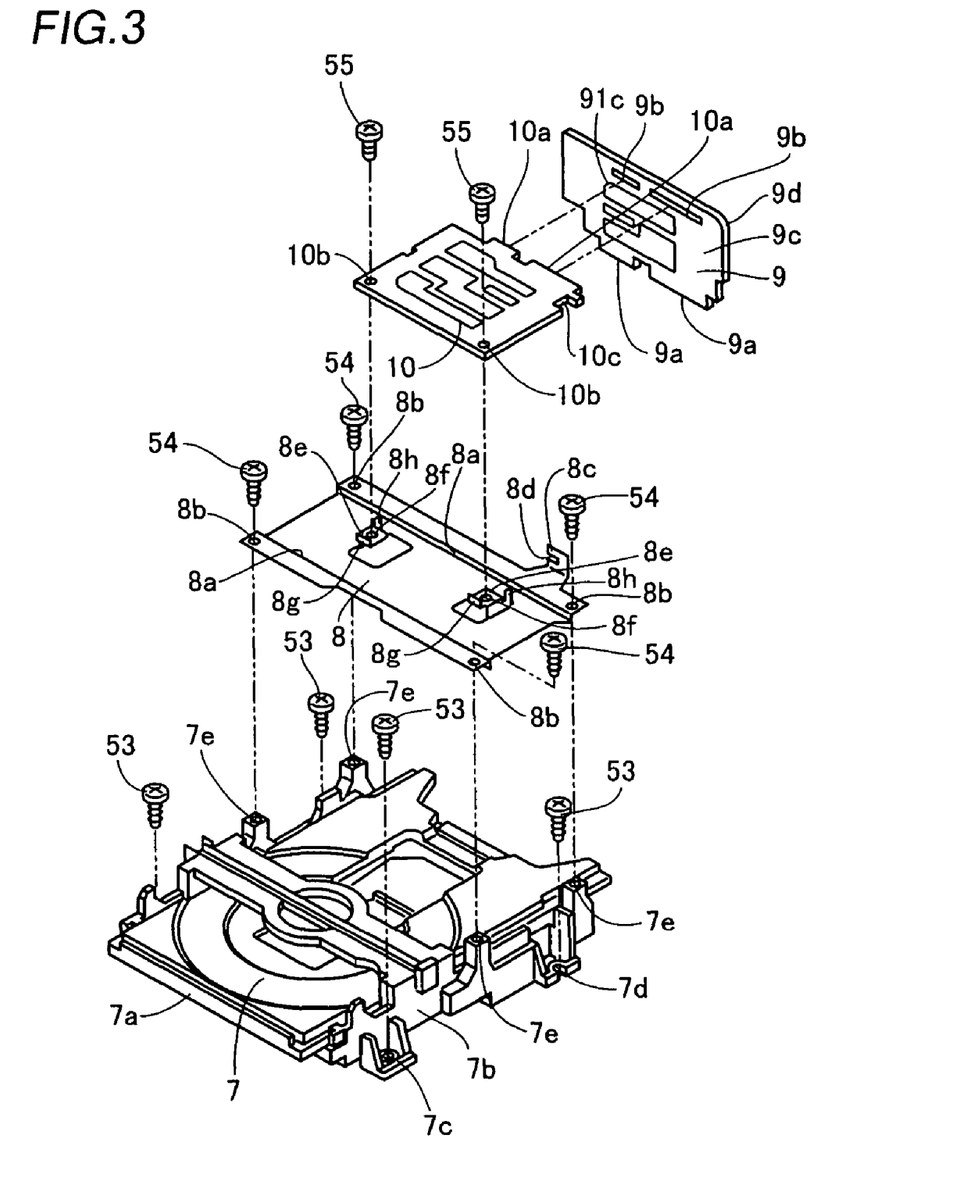
FIG. 3 is an exploded perspective view showing a vicinity of a cover member of the DVD-integrated television according to the embodiment shown in FIG. 1.
Figure 4:
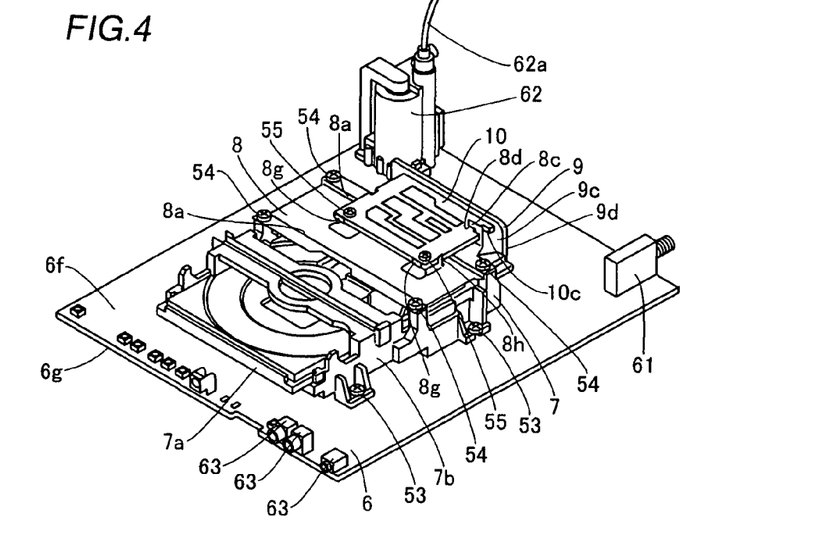
FIG. 4 is a perspective view showing a vicinity of a DVD drive unit of the DVD-integrated television according to the embodiment shown in FIG. 1.
Figure 5:
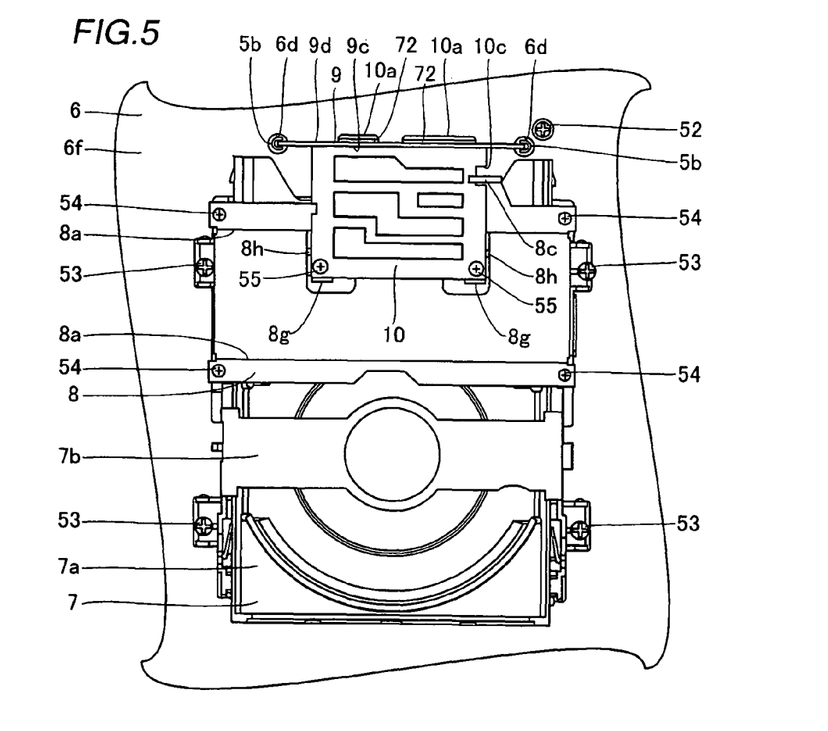
FIG. 5 is a plan view showing the vicinity of the DVD drive unit of the DVD-integrated television according to the embodiment shown in FIG. 1.

As shown in FIGS. 1 and 2, the DVD integrated television 1 according to the embodiment of the present invention comprises a front cabinet 2 and a rear cabinet 3 constituting an outer frame of the DVD integrated television 1, a CRT (cathode ray tube) 4 mounted on the front cabinet 2, a holder 5 made of resin, a main circuit board 6 for controlling display operation by the CRT4, a DVD drive unit 7 for driving a DVD (digital versatile disk) (not shown), a cover member 8 made of metal provided on an upper surface of the DVD drive unit 7, a relay board 9, a DVD circuit board 10 for controlling the DVD drive unit 7, and a CRT circuit board 11 for controlling a voltage of the CRT4. The holder 5 is an example of the "holding member" in the present invention, and the DVD drive unit 7 is an example of the "disk unit" in the present invention. The main circuit board 6 and the DVD circuit board 10 are examples of the "second circuit board" and the "first circuit board" in the present invention respectively.

Figure 6:
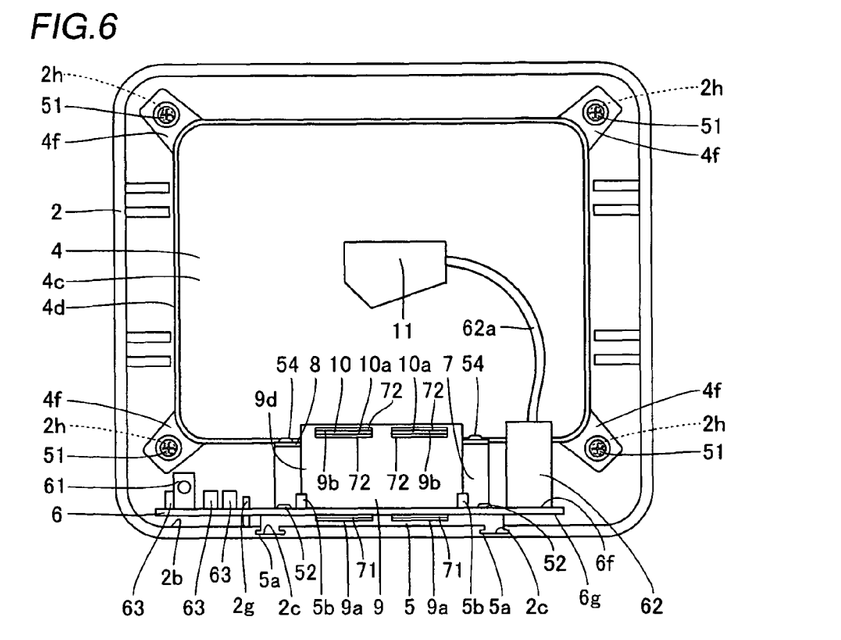
FIG. 6 is a front view showing the DVD-integrated television from which a rear cabinet is removed according to the embodiment shown in FIG. 1.

As shown in FIGS. 1, 2 and 6, the front cabinet 2 is provided with a display window 2a exposing a display region 4a of the CRT4, a bottom surface 2b, a pair of rail portions 2c formed on the bottom surface 2b, an operating portion 2d in which various manual operation buttons such as a power supply are arranged, an opening 2e for projecting an after-mentioned disk tray 7a of the DVD drive unit 7 outside the front cabinet 2, terminal receiving holes 2f each receiving an after-mentioned terminal connecting portion 63 of the main circuit board 6, holding rib portions 2g for holding the main circuit board 6 (see FIG. 6), screw mounting holes 2h for mounting the CRT4 (see FIG. 6). The opening 2e of the front cabinet 2 is mounted with a door member 21 that opens and closes in conjunction with projecting and housing of the disk tray 7a of the DVD drive unit 7, as shown in FIGS. 1 and 2.

The rear cabinet 3 is provided with a bottom surface 3a, a pair of rail portions 3b formed on the bottom surface 3a, holding rib portions 3c for holding the main circuit board 6, as shown in FIG. 2. The rear cabinet 3 is mounted on the front cabinet 2 by tightening screws (not shown) with respect to the front cabinet 2.

The CRT4 is mounted on the front cabinet 2 while the display region 4a is exposed from the display window 2a of the front cabinet 2, as shown in FIGS. 1, 2 and 6. The CRT4 includes the display region 4a, an electron gun 4b emitting an electron beam, and a glass tube 4c forming a vacuum region, and an explosion-proof band 4d made of iron wound around the glass tube 4c. The explosion-proof band 4d of the CRT4 has a function of preventing implosion of the glass tube 4c in a vacuum state, and includes screw mounting portions 4f formed with screw receiving holes 4e for mounting the CRT 4 on the front cabinet 2 respectively. Screws 51 are fitted in the screw mounting holes 2h (see FIG. 6) of the front cabinet 2 through the screw receiving holes 4e of the screw mounting portions 4f respectively, whereby the CRT 4 is mounted on the front cabinet 2.

As shown in FIGS. 2 and 6, the holder 5 made of resin includes four rail engaging portions 5a engaged with the pair of rail portions 2c of the front cabinet 2 and the pair of rail portions 3b of the rear cabinet 3 respectively, a pair of guide portions 5b guiding the relay board 9 in a substantially vertical direction, screw mounting holes 5c for mounting the main circuit board 6, and screw mounting holes 5d for mounting the DVD drive unit 7. The rail engaging portions 5a of the holder 5 are engaged with the rail portions 2c of the front cabinet 2 and the rail portions 3b of the rear cabinet 3 when the front cabinet 2 and the rear cabinet 3 are assembled, whereby the holder 5 is so formed as to be mounted on the front cabinet 2 and the rear cabinet 3.

As shown in FIGS. 2 and 4 to 6, the main circuit board 6 for controlling display operation of the CRT 4 is constituted by a single-sided board formed with a wiring (circuit pattern) 61f on only one surface (first surface 6f) and is so arranged below the DVD drive unit 7 as to overlap with the DVD drive unit 7. The main circuit board 6 includes an opening 6a, screw receiving holes 6b formed in portions corresponding to the screw mounting holes 5c of the holder 5 respectively, screw receiving holes 6c formed in portions corresponding to the screw mounting holes 5d of the holder 5 respectively, terminal receiving holes 6d each receiving an after-mentioned terminal portion 9a of the relay board 9, guide portion receiving holes 6e so arranged that the guide portions 5b of the holder 5 protrude upwardly. The first surface 6f of the main circuit board 6 is mounted with an antenna receiving portion 61 receiving an antenna wire, a fly back transformer 62 supplying a high voltage to the CRT 4, and the terminal connecting portions 63 used when connecting to other equipment. Screws 52 are fitted in the screw mounting holes 5c of the holder 5 through the screw receiving holes 6b respectively, whereby the main circuit board 6 is mounted on the holder 5. The main circuit board 6 is so formed as to be held by the holding rib portions 2g of the front cabinet 2 and the holding rib portions 3c of the rear cabinet 3 when the rear cabinet 3 is mounted on the front cabinet 2. The terminal receiving holes 6d are examples of the "second terminal receiving hole" in the present invention.

The DVD drive unit 7 includes the disk tray 7a, a DVD drive unit body portion 7b to which the disk tray 7a is mounted slidably in an anteroposterior direction, as shown in FIGS. 2 to 5. The disk tray 7a slides in the anteroposterior direction, whereby the disk tray 7a is projected outside the front cabinet 2 through the opening 2e of the front cabinet 2 and is housed inside the front cabinet 2. Thus, the disk tray 7a has a function of conveying the DVD (not shown) arranged therein. The DVD drive unit body portion 7b is formed with screw receiving holes 7c and screw receiving cutouts 7d formed in portions corresponding to the screw mounting holes 5d of the holder 5 and the screw receiving holes 6c of the main circuit board 6 respectively, and screw mounting holes 7e for mounting the cover member 8. Each of screws 53 is fitted in the screw mounting hole 5d of the holder 5 through the screw receiving hole 7c or the screw receiving cutout 7d and the screw receiving hole 6c of the main circuit board 6, whereby the DVD drive unit 7 is mounted on the holder 5. The DVD drive unit 7 is so formed that a pickup drive portion (not shown) of the DVD drive unit body portion 7b is arranged in the opening 6a of the main circuit board 6 at the time of driving of the DVD drive unit 7. The DVD drive unit body portion 7b is an example of the "disk unit body" in the present invention.

According to this embodiment, the cover member 8 made of metal provided on an upper surface of the DVD drive unit 7 is provided on both side end surfaces in a short-side direction with step portions 8a so as to extend in a longitudinal direction respectively, as shown in FIGS. 2 to 5. The step portions 8a of the cover member 8 have a function of locating the cover member 8, when the cover member 8 is mounted on the DVD drive unit body portion 7b. In the vicinity of both ends in the longitudinal direction of the two step portions 8a of the cover member 8, screw receiving holes 8b are formed in portions corresponding to the screw mounting holes 7e of the DVD drive unit 7 respectively. Screws 54 are fitted in the screw mounting holes 7e of the DVD drive unit 7 through the screw receiving holes 8b respectively, whereby the cover member 8 is mounted on the DVD drive unit 7. The step portions 8a formed on a side of the rear cabinet 3 is provided with a supporting portion 8c for supporting a vicinity of the terminal portions 10a of the DVD circuit board 10. The supporting portion 8c is formed with a cutout portion 8d for receiving a side end of the DVD circuit board 10. The cover member 8 is integrally provided with mounting portions 8e for mounting the DVD circuit board 10 on the cover member 8. The mounting portions 8e is formed with screw mounting holes 8f for mounting the DVD circuit board 10 on the cover member 8, and position regulating rib portions 8g and 8h for regulating a position of the DVD circuit board 10, so provided as to protrude upwardly. The position regulating rib portions 8g of the cover member 8 have a function of locating the DVD circuit board 10 with respect to a direction in which the terminal portions 10a extend, when the DVD circuit board 10 is mounted on the cover member 8. The position regulating rib portions 8h of the cover member 8 have a function of locating the DVD circuit board 10 with respect to a direction substantially perpendicular to a direction in which the terminal portions 10a extend, when the DVD circuit board 10 is mounted on the cover member 8. The position regulating rib portions 8g and 8h are examples of the "first position regulating rib portion" and "second position regulating rib portion" in the present invention respectively.

According to this embodiment, the relay board 9 is constituted by a single-sided board formed with a wiring 91c on one surface (first surface 9c) and is arranged between the main circuit board 6 and the DVD circuit board 10, as shown in FIGS. 2 to 6. The relay board 9 includes the terminal portions 9a protruding in a direction substantially parallel to the relay board 9, and terminal receiving holes 9b each receiving the after-mentioned terminal portion 10a of the DVD circuit board 10. The wiring 61f on the first surface 6f of the main circuit board 6 and the terminal portions 9a of the relay board 9 are electrically connected to each other by solders (not shown), and the terminal portions 9a of the relay board 9 are mounted on a second surface 6g of the main circuit board 6 by solders 71 (see FIG. 6) in a state that the terminal portions 9a of the relay board 9 are inserted into the terminal receiving holes 6d of the main circuit board 6 respectively. Thus, the relay board 9 is mounted on the main circuit board 6 with no influence on electrical connection between the relay board 9 and the main circuit board 6. Lower ends of the both side ends in the longitudinal direction of the relay board 9 are so guided as to be held between the pair of guide portions 5b of the holder 5 so arranged as to protrude upwardly from the guide portion receiving holes 6e of the main circuit board 6, whereby the relay board 9 is so mounted on the main circuit board 6 as to extend in a substantially vertical direction. The terminal portions 9a are examples of "second terminal portion" in the present invention, and the terminal receiving holes 9b are examples of the "first terminal receiving hole" in the present invention.

According to this embodiment, the DVD circuit board 10 for controlling the DVD drive unit 7 is constituted by a double-sided board formed with wirings on its both sides, and includes the terminal portions 10a protruding in a direction substantially parallel to the DVD circuit board 10, screw receiving holes 10b formed in portions corresponding to the screw mounting holes 8f of the cover member 8, a cutout portion 1c receiving the cutout portion 8d of the cover member 8, as shown in FIGS. 2 to 6. The wiring 91c on the first surface 9c of the relay board 9 and the terminal portions 10a of the DVD circuit board 10 are electrically connected to each other by solders (not shown), and the terminal portions 10a of the DVD circuit board 10 on a second surface 9d of the relay board 9 are mounted by solders 72 (see FIG. 6) in a state that the terminal portions 10a of the DVD circuit board 10 are inserted into the terminal receiving holes 9b of the relay board 9 respectively. Thus, the relay board 9 is supported by the DVD circuit board 10 with no influence on electrical connection between the DVD circuit board 10 and the relay board 9. Screws 55 are fitted in the screw mounting holes 8f of the cover member 8 through the screw receiving holes 10b respectively, whereby the cover member 8 is mounted on the DVD circuit board 10. At this time, the cutout portion 10c of the DVD circuit board 10 is arranged in the cutout portion 8d of the cover member 8, whereby the DVD circuit board 10 is supported by the supporting portion 8c of the cover member 8. The terminal portions 10a are examples of the "first terminal portion" in the present invention.

The CRT circuit board 11 for controlling a voltage of the CRT 4 is mounted with a mounting portion 11a connected to the CRT4 as shown in FIGS. 2 and 6. The CRT circuit board 11 is connected to the fly back transformer 62 mounted on the main circuit board 6 via a cable 62a.

According to this embodiment, as hereinabove described, the mounting portions 8e is provided in the cover member 8 provided on the upper surface of the DVD drive unit body portion 7b, and the DVD circuit board 10 for controlling the DVD drive unit 7 is mounted on the mounting portions 8e of the cover member 8, whereby no supporting member for supporting the DVD circuit board 10 may provided separately. Thus, the number of components can be inhibited from increase. The relay board 9 is arranged between the DVD circuit board 10 for controlling the DVD drive unit 7 and the main circuit board 6 for controlling display operation by the CRT4, the DVD circuit board 10 is provided with the terminal portions 10a, the relay board 9 is provided with the terminal receiving holes 9b receiving the terminal portions 10a, and the terminal portions 10a of the DVD circuit board 10 is soldered on the second surface 9d of the relay board 9 by the solders 72, whereby the relay board 9 can be supported by the DVD circuit board 10 without separately providing a member supporting the relay board 9. Thus, the number of components can be inhibited from increase. The DVD circuit board 10 for controlling the DVD drive unit 7, provided on the upper surface of the DVD drive unit 7, is arranged on the mounting portions 8e of the cover member 8, whereby the DVD integrated television 1 can be downsized dissimilarly in a case where the circuit board for controlling the disk unit is so arranged as to be adjacent to the disk unit. The main circuit board 6 for controlling display operation by the CRT4 is so provided below the DVD drive unit body portion 7b as to overlap with the DVD drive unit body portion 7b, whereby the DVD integrated television 1 can be downsized dissimilarly in a case where the circuit board for controlling display operation by the cathode ray tube is so arranged as to be adjacent to the disk unit. Thus, the DVD integrated television 1 can be downsized while inhibiting the number of components from increase.

According to this embodiment, the terminal portions 10a of the DVD circuit board 10 and the relay board 9 are so formed as to be electrically connected to each other by soldering the same on the first surface 9c of the relay board 9, whereby the DVD circuit board 10 and the relay board 9 can be electrically connected to each other without using a connector or the like. Also according to this structure, the number of components can be inhibited from increase.

According to this embodiment, the terminal portions 10a of the DVD circuit board 10 are fixed on the second surface 9d of the relay board 9 by the solders 72 respectively, in a state that the terminal portions 10a of the relay board 10 are inserted into the terminal receiving holes 9b of the relay board 9 respectively. Thus, the terminal portions 10a of the DVD circuit board 10 are fixed on the relay board 9 with no influence on electrical connection between the DVD circuit board 10 and the relay board 9.

According to this embodiment, the terminal portions 9a of the relay board 9 and the main circuit board 6 are so formed as to be electrically connected to each other by soldering the same on the first surface 6f of the main circuit board 6, whereby the relay board 9 and the main circuit board 6 can be electrically connected to each other without using a connector or the like. Thus, the number of components can be inhibited from increase.

According to this embodiment, the terminal portions 9a of the relay board 9 are fixed on the second surface 6g of the main circuit board 6 by the solders 71 in a state that the terminal portions 9a of the relay board 9 are inserted into the terminal receiving holes 6d of the main circuit board 6 respectively. Thus, the terminal portions 9a of the relay board 9 can be fixed on the main circuit board 6 with no influence on electrical connection between the main circuit board 6 and the relay board 9.

According to this embodiment, the holder 5 supporting the main circuit board 6 and the DVD drive unit 7 is provided below the main circuit board 6 and is integrally provided with the guide portions 5b for guiding the lower ends of the both side ends of the relay board 9 in a direction substantially perpendicular to the main circuit board 6, and the main circuit board 6 is provided with the guide portion receiving holes 6e so arranged that the guide portions 5b of the holder 5 protrude upwardly from the main circuit board 6. Thus, the relay board 9 can be easily mounted in a direction substantially perpendicular to the surface of the main circuit board 6 when the relay board 9 is mounted on the main circuit board 6.

According to this embodiment, the mounting portions 8e of the cover member 8 are formed with the screw mounting holes 8f respectively, and the screw receiving holes 10b are formed in portions corresponding to the screw mounting holes 8f of the DVD circuit board 10 respectively, whereby the screws 55 are fitted in the screw mounting holes 8f of the cover member 8 through the screw receiving holes lob of the DVD circuit board 10 respectively. Thus, the DVD circuit board 10 can be easily mounted on the cover member 8.

According to this embodiment, the mounting portions 8e of the cover member 8 are formed with the position regulating rib portions 8g for regulating a position of the DVD circuit board 10 with respect to a direction in which the terminal portions 10a extend, respectively, whereby locating can be easily carried out when the DVD circuit board 10 is mounted on the cover member 8.

According to this embodiment, the mounting portions 8e of the cover member 8 is formed with the position regulating rib portions 8h for regulating a position of the DVD circuit board 10 with respect to a direction substantially perpendicular to a direction in which the terminal portions 10a extend, respectively, whereby locating can be more easily carried out when the DVD circuit board 10 is mounted on the cover member 8.

According to this embodiment, the cover member 8 is formed with the supporting portion 8c for supporting a vicinity of the terminal portions 10a of the DVD circuit board 10, whereby the DVD circuit board 10 can be more stably mounted on the cover member 8.

According to this embodiment, the supporting portion 8c of the cover member 8 is formed with the cutout portion 8d for receiving the side end of the DVD circuit board 10, whereby the DVD circuit board 10 can be easily supported by the supporting portion 8c.

Although the present invention has been described and illustrated in detail, it is clearly understood that the same is by way of illustration and example only and is not to be taken byway of limitation, the spirit and scope of the present invention being limited only by the terms of the appended claims.

For example, while the DVD circuit board is mounted on the cover member by screws in the aforementioned embodiment, the present invention is not restricted to this but an engaging portion for mounting the DVD circuit board on the cover member is provided, and the DVD circuit board may be mounted on the cover member by the engaging portion.

While the guide portion is provided in the holder, the guide portion receiving holes are provided in the main circuit board, and the both side end surfaces of the relay board are guided by the guide portions of the holder arranged in the guide portion receiving holes of the main circuit board in the aforementioned embodiment, the present invention is not restricted to this but guide portions are provided in the main circuit board instead of the guide portion receiving holes, and may guide the both side end surfaces of the relay board.

What is claimed is:

1. A disk unit-integrated display comprising: a disk unit including a disk unit body;
    a cathode ray tube displaying an image reproduced by at least said disk unit;
    a cover member provided on an upper surface of said disk unit body and including an mounting portion;
    a first circuit board for controlling said disk unit, mounted on said mounting portion of said cover member;
    a second circuit board for controlling display operation by said cathode ray tube, so arranged below said disk unit body as to overlap with said disk unit body; and
    a relay board so mounted as to extend in a direction perpendicular to a surface of said second circuit board, supported by said first circuit board, and arranged between said first circuit board and said second circuit board, wherein
    said first circuit board includes a first terminal portion protruding in a direction parallel to a surface of said first circuit board, and
    said relay board includes a first terminal receiving hole receiving said first terminal portion of said first circuit board.

2. The disk unit-integrated display according to claim 1, wherein
    said relay board includes a first surface with a wiring formed thereon and a second surface without a wiring formed thereon, and
    said first terminal portion of said first circuit board and said first surface of said relay board are electrically connected to each other in a state that said first terminal portion of said first circuit board is inserted into said first terminal receiving hole of said relay board.

3. The disk unit-integrated display according to claim 2, wherein
    said first terminal portion of said first circuit board is fixed on said second surface of said relay board by a solder in a state that said first terminal portion of said first circuit board is inserted into said first terminal receiving hole of said relay board.

4. The disk unit-integrated display according to claim 1, wherein, said relay board includes a second terminal portion protruding in a direction parallel to a surface of said relay board, and said second circuit board includes a second terminal receiving hole receiving said second terminal portion of said relay board.

5. The disk unit-integrated display according to claim 4, wherein
    said second circuit board includes a first surface with a wiring formed thereon and a second surface without a wiring formed thereon, and
    said second terminal portion of said relay board and said first surface of said second circuit board are electrically connected to each other in a state that said second terminal portion of said relay board is inserted into said second terminal receiving hole of said second circuit board.

6. The disk unit-integrated display according to claim 5, wherein
said second terminal portion of said relay board is fixed on said second surface of said second circuit board by a solder in a state that said second terminal portion of said relay board is inserted into said second terminal receiving hole of said second circuit board.

7. The disk unit-integrated display according to claim 1, further comprising;
a holding member arranged below said second circuit board and supporting said second circuit board and said disk unit, wherein
said holding member integrally includes a pair of guide portions for guiding a side end surface of said relay board in a direction perpendicular to said second circuit board, said pair of guide portions are so provided as to hold both of the side end surfaces of said relay board there between and extend upwardly, and said second circuit board includes a guide portion receiving hole so arranged that each of said pair of guide portions protrudes upwardly from said second circuit board therethrough.

8. The disk unit-integrated display according to claim 1 wherein,
said mounting portion of said cover member is formed with a screw mounting hole, and
said first circuit board includes a screw receiving hole formed in a portion corresponding to said screw mounting hole of said cover member.

9. The disk unit-integrated display according to claim 1 wherein,
said mounting portion of said cover member is formed with a first position regulating rib portion for regulating a position of said first circuit board with respect to a direction in which said first terminal portion extends.

10. The disk unit-integrated display according to claim 1 wherein, said mounting portion of said cover member is formed with a second position regulating rib portion for regulating a position of said first circuit board with respect to a direction perpendicular to a direction in which said first terminal portion extends.

11. The disk unit-integrated display according to claim 1, wherein said cover member is provided with a supporting portion for supporting an area of said first circuit board near said first terminal portion of said first circuit board.

12. The disk unit-integrated display according to claim 11, wherein
said supporting portion of said cover member is formed with a cutout portion for receiving a side end of said first circuit board.

13. The disk unit-integrated television comprising: a disk unit including a disk unit body;
a cathode ray tube displaying an image reproduced by at least said disk unit;
a cover member provided on an upper surface of said disk unit body;
a first circuit board for controlling said disk unit;
a second circuit board for controlling display operation by said cathode ray tube;
a relay board so mounted as to extend in a direction perpendicular to a surface of said second circuit board, supported by said first circuit board, and arranged between said first circuit board and said second circuit board; and
a holding member arranged below said second circuit board and supporting second circuit board and said disk unit, wherein said cover member includes a mounting portion, said first circuit board is mounted on said mounting portion of said cover member and includes a first terminal portion protruding in a direction parallel to a surface of said first circuit board, said second circuit board is so arranged below said disk unit body as to overlap with said disk unit body, said holding member integrally includes a pair of guide portions for guiding a side end surface of said relay board in a direction perpendicular to said second circuit board, said pair of guide portions are so provided as to hold both of the side end surfaces of said relay board therebetween and extend upwardly, said relay board includes a first surface with a wiring formed thereon, a second surface without a wiring formed thereon, a first terminal receiving hole receiving said first terminal portion of said first circuit board, and a second terminal portion protruding in a direction parallel to a surface of said relay board, said first terminal portion of said first circuit board and said first surface of said relay board are electrically connected to each other in a state that said first terminal portion of said first circuit board is inserted into said first terminal receiving hole of said relay board, said second circuit board includes a first surface with a wiring formed thereon, a second surface without a wiring formed thereon, a second terminal receiving hole receiving said second terminal portion of said relay board, and a guide portion receiving hole so arranged that each of said pair of guide portions protrudes upwardly from said second circuit board therethrough, and said second terminal portion of said relay board and said first surface of said second circuit board are electrically connected to each other in a state that said second terminal portion of said relay board is inserted into said second terminal receiving hole of said second circuit board.

14. The disk unit-integrated television according to claim 13, wherein
said first terminal portion of said first circuit board is fixed on said second surface of said relay board by a solder in a state that said first terminal portion of said first circuit board is inserted into said first terminal receiving hole of said relay board.

15. The disk unit-integrated television according to claim 13, wherein
said second terminal portion of said relay board is fixed on said second surface of said second circuit board by a solder in a state that said second terminal portion of said relay board is inserted into said second terminal receiving hole of said second circuit board.

16. The disk unit-integrated television according to claim 13, wherein
said mounting portion of said cover member is formed with a screw mounting hole, and
said first circuit board includes a screw receiving hole formed in a portion corresponding to said screw mounting hole of said cover member.

17. The disk unit-integrated television according to claim 13, wherein,
said mounting portion of said cover member is formed with a first position regulating rib portion for regulating a position of said first circuit board with respect to a direction in which said first terminal portion extends.

18. The disk unit-integrated television according to claim 13, wherein said mounting portion of said cover member is formed with a second position regulating rib portion for regulating a position of said first circuit board with respect to a direction perpendicular to a direction in which said first terminal portion extends.

19. The disk unit-integrated television according to claim 13, wherein said cover member is provided with a supporting portion for supporting an area of said first circuit board near said first terminal portion of said first circuit board.

20. The disk unit-integrated television according to claim 19, wherein
said supporting portion of said cover member is formed with a cutout portion for receiving a side end of said first circuit board.

* * * * *